United States Patent [19]

Auteri

[11] Patent Number: 5,222,179
[45] Date of Patent: Jun. 22, 1993

[54] MEANS FOR ROUTING RIBBON TYPE FIBER OPTIC CABLE

[75] Inventor: Robert P. Auteri, Manorville, N.Y.
[73] Assignee: Porta Systems Corp., Syosset, N.Y.
[21] Appl. No.: 844,541
[22] Filed: Mar. 2, 1992
[51] Int. Cl.⁵ ............................................. G02B 6/36
[52] U.S. Cl. .................................. 385/114; 385/121; 385/136; 385/137
[58] Field of Search .............. 385/114, 134, 136, 137, 385/147, 54, 55, 62, 63, 65, 66, 121

[56] References Cited

U.S. PATENT DOCUMENTS

| | | | |
|---|---|---|---|
| 4,597,030 | 6/1986 | Brody et al. | 385/114 X |
| 4,650,280 | 3/1987 | Sedlmayr | 385/137 X |
| 5,134,673 | 7/1992 | Stephenson et al. | 385/54 X |

OTHER PUBLICATIONS

Att Instruction Sheet #633-501-101-14, Aug. 1984.
Att. Practice Standard #636-299-110, Feb. 1988.

Primary Examiner—John D. Lee
Assistant Examiner—S. W. Barns
Attorney, Agent, or Firm—Charles E. Temko

[57] ABSTRACT

An improved means and method for routing and managing ribbon type fiber optic cables used in the telecommunications industry. The means includes a split housing defining an entry channel formed by a shank adapted to be clamped beneath an outer sheath enclosing a plurality of ribbon cables whereby an included plurality of such ribbon cables enter the hollow shank and are conducted to a recess from which they are individually introduced into one of a plurality of parallel planar channels from which they are guided to separate locations for separation of the individual fibers comprising the ribbon cables to be further separated and terminated at final locations. The housings may be manufactured in a variety of sizes depending upon the number of ribbon cables to be routed, and may be used singly, or in serially associated fashion.

1 Claim, 3 Drawing Sheets

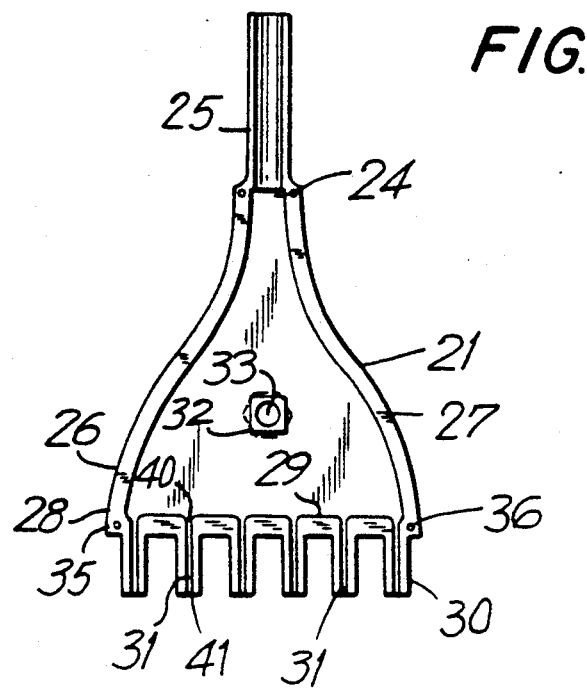
FIG. 2
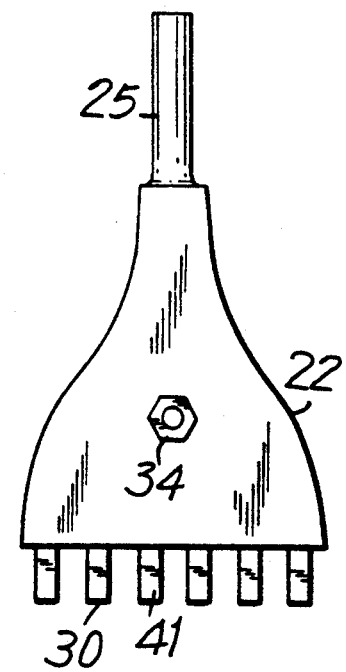
FIG. 3
FIG. 4

MEANS FOR ROUTING RIBBON TYPE FIBER OPTIC CABLE

BACKGROUND OF THE INVENTION

This invention relates generally to the transmission of data through fiber optic cables commonly used in the telecommunications industry, and more particularly to an improved means and method for the routing and installation of ribbon type fiber optic cables of known type.

The use of so-called ribbon type cables in which a plurality of fiber optic conductors are molded together within a flat ribbon cover has gained considerable popularity in recent years for the same reasons that have been related to the use of copper wire counterparts. Among them is the ability to quickly identify a particular conductor within the group of conductors comprising the ribbon, and the ability to utilize relatively narrow spaces into which the ribbon cables are inserted.

The running of such cables, however, presents handling problems which do not find an equivalent in other types of fiber optic cables. As compared with flat copper wire cable, the fiber optic cables are very thin ribbons of minute thickness, and of relatively small width, depending upon the number of fiber optic conductors enclosed. The ribbons are relatively fragile, requiring careful handling to avoid damage, and because of the small cross sectional area, means must be provided to prevent bending of the ribbon to less than a minimum radius to prevent additional signal attenuation, breaking or excessively stressing of the fiber optic filaments therein. These problems are substantially different than those encountered in the case of individual conductors having a cylindrical cross section.

SUMMARY OF THE INVENTION

Briefly stated, the invention contemplates the provision of a means and method to manage, block and distribute ribbon type fiber optical cables, a number of which are enclosed within a cylindrical outer jacket to enable service personnel to conveniently interconnect the same without damage and with the ability to readily identify individual subscriber lines. The means includes ribbon splitter elements of varying sizes adapted to engage and protect a plurality of such flat cables emanating from a common cable to maintain the same in parallel planes for subsequently guiding the same to in plant equipment such as local networks, mainframes, cable drawers and the like. Larger and smaller elements each include a hollow cylindrical sleeve adapted to be clamped beneath the outer shield of the incoming cable, the sleeve leading to a hollow, generally planar recess within a housing wherein the individual ribbons are directed to flat channel forming members from which they exit from the housing in individual directions. The larger cable splitting elements may be supplemented by smaller devices handling a few number of such flat cables in a similar manner, where required.

BRIEF DESCRIPTION OF THE DRAWINGS

In the drawings, to which reference will be made in the specification, similar reference characters have been employed to designate corresponding parts throughout the several views.

FIG. 2 is a transverse sectional view of a larger cable splitting element forming a part of the disclosed embodiment.

FIG. 3 is a side elevational view thereof, partly in section.

FIG. 4 is a side elevational view showing a side opposite that seen in FIG. 2.

DETAILED DESCRIPTION OF THE DISCLOSED EMBODIMENT

Figure 1:
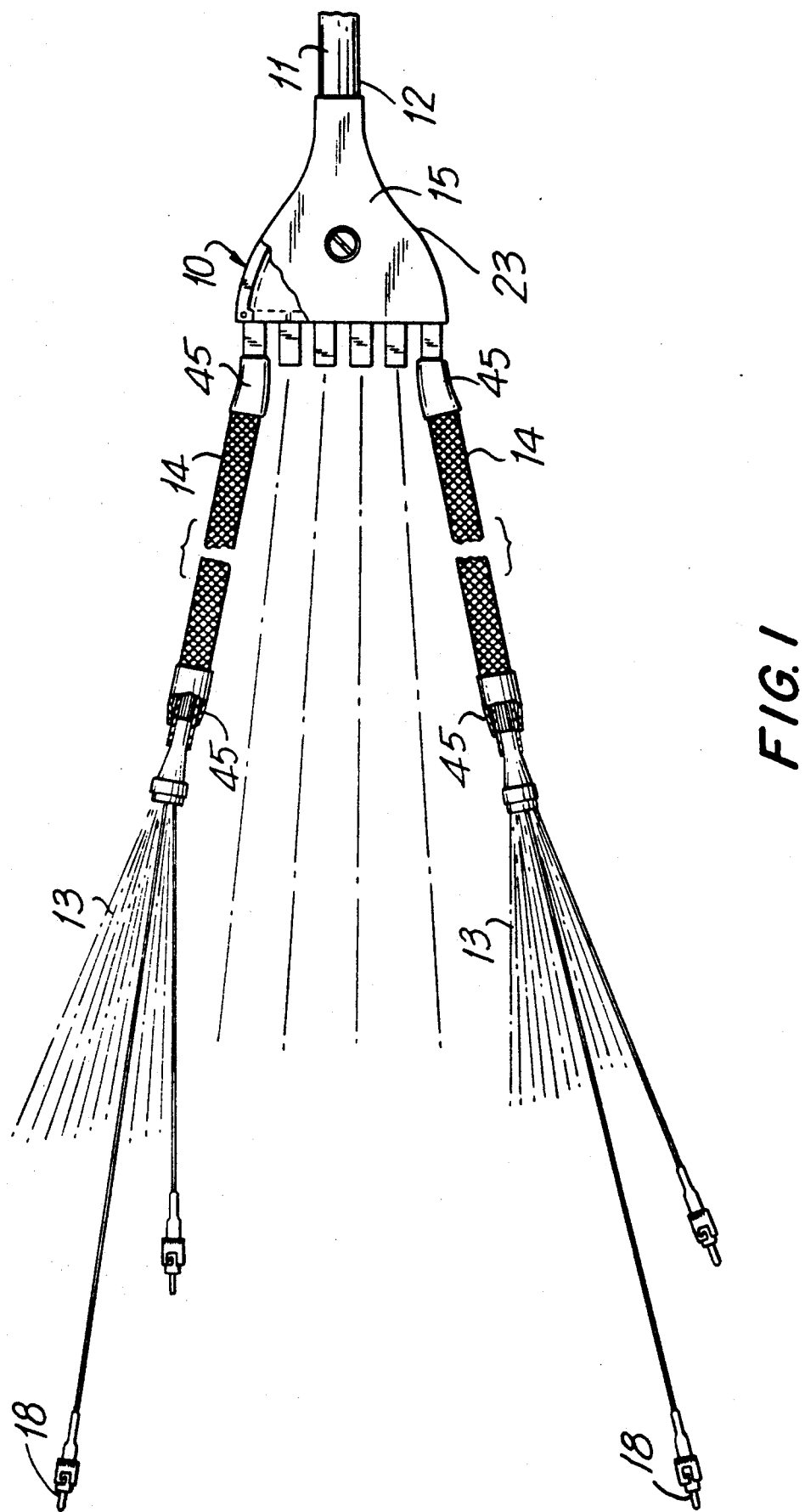
FIG. 1 is a side elevational view of a typical ribbon type fiber optic cable interconnection embodying the invention.

In accordance with the invention, reference character 10 designates an embodiment of the invention including a single outside plant fiber optic cable 11 having a generally cylindrical outside jacket 12 enclosing a plurality of ribbon type cables 13. The jacket 12 is terminated at a point of engagement with a larger cable splitter element 15, allowing the cables 13 to pass therethrough and emanate individually to points of interconnection 18.

The element 15 may be of cast aluminum, or, preferably molded from suitable synthetic resinous materials, and is most conveniently formed as a pair of symmetrical members 21 and 22, which, in interconnected condition, form a main body 23 having a first or cable entry end 24 from which a hollow cylindrical sleeve 25 projects. Each member 21-22 is bounded by a pair of peripheral side walls 26 and 27, leading to a second end 28 bounded by a transversely extending wall 29.

Extending axially from the wall 29 are plural ribbon engaging projections, each forming a planar channel 31 corresponding in cross section to that of an individual ribbon cable 13. A supporting rib 32 includes a bore 33 accommodating corresponding nut and screw means 34 for interconnecting the first and second members 21 and 22. Alignment is maintained by the provision of a plurality of corresponding projections 35 engaging recesses 36.

Each of the projections 30 extends between an inner end 40 and an outer end 41 from which the individual cables 13 exit.

As seen in FIG. 1, the exiting cables can be protected by a braided fiber protection tube assembly 14 having a heat shrinkable terminal 45 at each end thereof. The assemblies are known in the art, and are usually formed from an expandable monofilament braided tubing.

Figure 5:
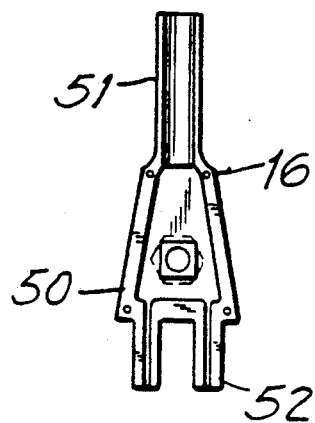
FIG. 5 is a sectional view corresponding to that seen in FIG. 2, but showing a smaller cable splitting element.
Figure 6:
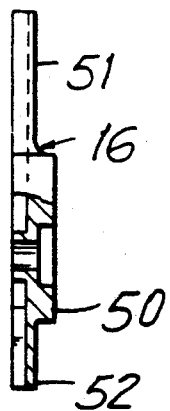
FIG. 6 is a side elevational view thereof, partly in section.
Figure 7:
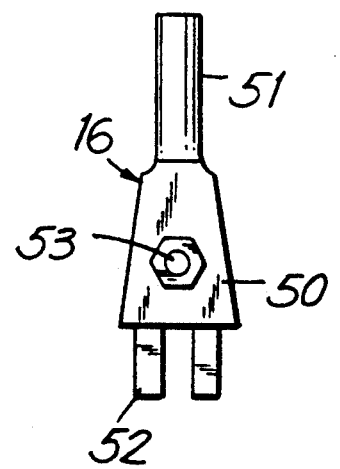
FIG. 7 is a side elevational view showing the side opposite that seen in FIG. 2.

The smaller splitter element 16 (See FIG. 5–7), inclusive, are generally similar to the larger elements 15, but are configured to accommodate a smaller number of ribbon cables. They may be used in lieu of the larger element, or to supplement the larger element, where necessary, in order to provide additional guiding means. As in the case of the larger elements, smaller elements each include a main body 50, a cylindrical shank 51 and ribbon engaging projections 52 as well as screw and nut means 53.

During installation, as best seen in FIG. 1, the cylindrical shank 25 is inserted directly into the end of the jacket 12 wherein it may be clamped by means (not shown) in known manner, this engagement procedure including the injection of a suitable sealant known in the art. Where the smaller elements 16 are employed in the same manner for smaller fiber counts.

It may thus be seen that I have invented novel and highly useful improvements in means and method for routing planar ribbon type fiber optic cables, in which there is provided a means preventing entanglement of individual cables and the maintenance of the same in separated condition for routing. As contrasted with prior art devices, the disclosed cable splitter elements include means for maintaining each of the separated cables in relatively parallel condition, wherein there is no likelihood of their becoming entangled as the individual cables are routed and connected to an ultimate location. The splitter elements may be conveniently manufactured at relatively low cost using known casting or molding techniques.

I wish it to be understood that I do not consider the invention to be limited to the precise details of structure shown and set forth in the specification, for obvious modifications will occur to those skilled in the art to which the invention pertains.

I claim:

1. A device for routing a plurality of planar ribbon-type fiber optical cables emanating from a larger jacketed cable, wherein each of said plurality of cables is maintained with the plane thereof in a generally parallel relation relative to the plane of the others of said plurality of cables for directing each of the ribbon-type fiber cables to areas of interconnection comprising: first and second substantially congruent, generally planar members (21-22) forming a hollow housing, said housing including a cable entry end (24), said end having a hollow cylindrical sleeve (25) thereon, said sleeve communicating with a hollow planar recess within said housing; said housing having a cable exit end (41) bounded by a transversely extending wall (29), said wall having a plurality of axially-extending channel forming members (31) thereon, each defining a planar passage therein corresponding in cross section to that of a planar ribbon cable, the plane of each of said passages being in substantially mutually parallel relation; and means for selectively interconnecting said first and second housing members after positioning of said plurality of fiber optical cables therein.

* * * * *